United States Patent Office 3,699,057
Patented Oct. 17, 1972

3,699,057
LUBRICATION
John J. Halko, Sr., and Andrew R. Halko, Washington Park, Del. (both % Freeland Chemical Co., 1605 McArthur Road, New Castle County Air Base, Del.)
No Drawing. Filed Jan. 30, 1970, Ser. No. 7,225
Int. Cl. C10m 3/22, 3/04
U.S. Cl. 252—49.3                                                 7 Claims

ABSTRACT OF THE DISCLOSURE

Aqueous solution of poly(ethylene oxide) of molecular weight 1,000,000 to 5,000,000 makes very effective lubricant for rubber, particularly for mounting rubber tires on drop-center metal wheels. Adding to the solution N,N-diethanol coconut fatty acid amide and N,N-diethanolamine salt of long chain fatty acid, improves it and also inhibits rusting of wheels made of ferrous metal. Isopropanol can also be present in solution and stabilizes the poly(ethylene oxide).

---

The present invention relates to the lubrication of rubber, and more particularly to such lubrication in connection with the mounting of rubber tires on drop-center metal wheels.

Among the objects of the present invention is the provision of novel lubricating techniques and mixtures for the foregoing purposes.

It has been discovered that an aqueous solution of poly(ethylene oxide) having a molecular weight of 1,000,000 to 5,000,000 makes a very effective and inexpensive lubricant for rubber, as in mounting tires on drop-center rims. Such polymer is a solid and shows substantially no tendency to be absorbed in or weaken rubber. There is accordingly no danger of damaging a tire even if the lubricant solution is applied in excessive quantities. The most effective concentrations of polymer are from about 1/50 to 1/10% by weight, so that very little of it is present.

The foregoing polymers have a tendency to degrade on standing, particularly in the light, at elevated temperatures, and in contact with transition meals such as iron. It is accordingly helpful to include in the lubricant solution a small amount of isopropanol or other stabilizer. Isopropanol is very inexpensive, suppresses foaming, and assists in the dissolving of the polymer, so that it is preferred. About 1/8 to about 2/3% isopropanol by weight are particularly desirable amounts.

Because of the above-noted high dilutions it is advantageous to prepare the lubricant solution from a concentrate. Unfortunately the polymer is difficult to dissolve in water in high concentrations, and at concentrations approaching about 1/2% its solutions tend to be unstable. These difficulties are reduced by compounding the concentrate with a wetting agent, preferably a low sudsing agent such as N,N-diethanol coconut fatty acid amide. While other low sudsers can be used this one is particularly desirable and is used in an amount 10 to 30 times that of the polymer. Such wetting agents also contribute lubricity although with much less effectiveness than the polymer. However the amount of polymer can be reduced somewhat when these wetting agents are also included.

The concentrate containing the combination of polymer and amide can be conveniently made ten to twenty times as strong as the final lubricant yet readily diluable, so that a corresponding dilution with water is effected before use by simply pouring the concentrate into the diluting water. By further incorporating in the mixture an N,N-diethanolamine salt of a long chain fatty acid the mixture becomes a very good rust and corrosion inhibitor. This gives it a long life in metal containers and also keeps it from causing rust formation on ferrous metal wheels. For these purposes the amine salt can be in a concentration about half that of the amide.

While the wetting agents in the foregoing mixtures are present in an amount several times that of the polymer, their contribution to the lubricity is a very small fraction of that of the polymer. It is estimated that it takes about 150 parts of the wetting agent to furnish the lubrication of one part of polymer. The presence of the wetting agents leaves more of a residue on the rubber that is luricated, but such residue is still a great deal less than would be left if the lubricity were provided without the polymer.

The poly(ethylene oxide) referred to above is a straight-chain polymer made by polymerizing ethylene oxide. One such polymer is sold by Union Carbide Corporation under the designation Polyox WSR 301. The coconut fatty acids are one or more of the fatty acids that have from about 10 to 14 carbons in the molecule. The long chain fatty acid has from about 12 to about 20 carbons in the molecule.

The following are typical examples of concentrates pursuant to the present invention:

EXAMPLE I

| | |
|---|---|
| Powdered poly(ethylene oxide) of molecular weight 4,000,000 | grams__ 460 |
| 99.5% isopropanol | liquid oz__ 160 |
| N,N-diethanol coconut fatty acid amide | do____ 275 |
| N,N-diethanolamine oleate | do____ 125 |
| Water to make 20 gallons total. | |

The polymer is first mixed with the isopropanol and while stirring this mixture is poured into about 15.6 gallons of water. After a few minutes of agitation there is then added the remaining ingredients and the resulting batch further agitated until homogeneous. Any build-up of foam can be conntered by spraying a little extra isopropanol on the foam, so that the batch is essentially free of foam and ready for packaging. It is diluted with 15 times its volume of water to make a very effective tire-mounting and spring shackle lubricant.

EXAMPLE II

| | |
|---|---|
| Powdered poly(ethylene oxide) having a molecular weight of 2,000,000 | grams__ 525 |
| Isopropanol (99.5%) | liquid oz__ 100 |
| N,N-diethanol lauramide | do____ 225 |
| Water to make 20 gallons. | |

This mixture can be prepared in the same manner described in connection with Example I.

EXAMPLE III

Powdered poly(ethylene oxide) having a molecular weight of 5,000,000 is added to 200 times its weight of boiling water, the mixture thus formed stirred and permitted to cool, after which there is added to it the amide of Example I in an amount 8 times the weight of the polymer, and oleate of Example I in an amount 4 times the weight of the polymer.

The resulting composition is stirred to make a concentrate that can also be diluted with 15 times its volume of water to give a very desirable rubber lubricant.

EXAMPLE IV

| | |
|---|---|
| Powdered poly(ethylene oxide) having a molecular weight of 1,000,000 | grams__ 600 |
| N,N-diethanol coconut fatty amide | liquid oz__ 225 |
| Water to make 20 gallons. | |

The polymer is gradually educted by means of a meter jet injector into a stream of water that passes through the injector into a 30 gallon drum provided with a turbine type stirrer. The stirrer is operated during the injection and for about 20 to 30 minutes after all the polymer is in the drum. The remaining water and the amide are then added with further stirring until uniform. This mixture can also be diluted as in the other examples, before use.

In general very desirable concentrates have, by weight, about 1/3 to 1½% polymer and about 5 to 25% low sudsing wetting agent. Where the amine salt is also present its concentration is preferably about 3 to 10% by weight, and where isopropanol is used its concentration is preferably from about 2 to 6% by weight.

In ready-to-lubricate form the polymer is as pointed out above at a concentration of from about 1/60 to 1/10% by weight. Where the wetting agent, amine salt, and/or isopropanol are present their concentrations in this diluted condition preferably range respectively from about 1/3 to 2%, about 1/5 to 2/3% and about 1/8 to 2/5%, all calculated by weight.

Obviously many other modifications and variations of the present invention are possible in the light of the above teachings. Within the scope of the appended claims the invention may accordingly be practiced otherwise than as specifically described.

What is claimed:

1. A concentrated aqueous liquid for lubricant application after dilution with water, sad liquid being a water solution of by weight about 1/3 to 1½% water-soluble poly(ethylene oxide) of molecular weight about 1,000,000 to 5,000,000, about 5 to 25% N,N-diethanol coconut fatty acid amide, and about 2 to 6% isopropanol by weight.

2. A cencentrated aqueous liquid for lubricant application after dilution with water, said liquid being a water solution of by weight about 1/3 to 1½% water-soluble poly(ethylene oxide) of molecular weight about 1,000,000 to 5,000,000, about 5 to 25% N,N-diethanol coconut fatty acid amide, about 3 to 10% diethanolamine salt of long chain fatty acid, and about 2 to 6% isopropanol by weight.

3. A lubricant for lubricating the engagement between rubber and ferrous metal, the luricant being an aqueous solution of by weight at least about 1/60% but less than ½% water-solule poly(ethylene oxide) that has a molecular weight about 1,000,000 to 5,000,000, about 1/3 to 2% N,N-diethanol coconut fatty acid amide, and a small amount of isopropanol effective to stabilize the poly(ethylene oxide).

4. A lubricant for lubricating the engagement between rubber and ferrous metal, the lubricant being an aqueous solution of by weight at least about 1/60 but less than ½% water-soluble poly(ethylene oxide) that has a molecular weight about 1,000,000 to 5,000,000, about 1/3 to 2% N,N-diethanol coconut fatty acid amide, about 1/5 to 2/3% diethanolamine salt of long chain fatty acid, and a small amount of isopropanol effective to stabilize the poly (ethylene oxide).

5. In the method of lubricating the mounting of a rubber tire on a drop-center metal wheel, the improvement according to which the lubricant is an aqueous solution containing at least about 1/60% but less than ½% by weight of a poly(ethylene oxide) having a molecular weight about 1,000,000 to 5,000,000.

6. The combination of claim 5 in which the lubricant is an aqueous solution of by weight at least about 1/60% but less than ½% water-soluble poly(ethylene oxide) that has a molecular weight about 1,000,000 to 5,000,000, about 1/3 to 2% N,N-diethanol coconut fatty acid amide, and a small amount of isopropanol effective to stabilize the poly(ethylene oxide).

7. The combination of claim 5 in which the lubricant is an aqueous solution of by weight at least about 1/60 but less than ½% water-soluble poly(ethylene oxide) that has a molecular weight about 1,000,000 to 5,000,000, about 1/3 to 2% N,N-diethanol coconut fatty acid amide, about 1/5 to 2/3% diethanolamine salt of long chain fatty acid, and a small amount of isopropanol effective to stabilize the poly(ethylene oxide).

References Cited

UNITED STATES PATENTS

| | | | |
|---|---|---|---|
| 3,079,336 | 1/1963 | Straight et al. | 252—8.55 D |
| 3,227,652 | 1/1966 | Ackerman | 252—49.5 |
| 3,242,115 | 3/1966 | McGary | 260—29.2 EP |
| 3,244,638 | 4/1966 | Foley et al. | 252—49.5 X |

DANIEL E. WYMAN, Primary Examiner

W. H. CANNON, Assistant Examiner

UNITED STATES PATENT OFFICE
CERTIFICATE OF CORRECTION

Patent No. 3,699,057            Dated October 17, 1972

Inventor(s) John J. Halko, Sr., et al

It is certified that error appears in the above-identified patent and that said Letters Patent are hereby corrected as shown below:

Column 2, line 59, --the-- should appear before "oleate".

penultimate line, "meter" should be --water--.

Claim 1, line 2, "sad" should be --said--.

Claim 3, line 4, "water-solule" should be --water-soluble--.

Signed and sealed this 8th day of May 1973.

(SEAL)
Attest:

EDWARD M. FLETCHER, JR.           ROBERT GOTTSCHALK
Attesting Officer                 Commissioner of Patents